US012398472B2

(12) United States Patent
Al-Hashmy et al.

(10) Patent No.: US 12,398,472 B2
(45) Date of Patent: Aug. 26, 2025

(54) INTELLIGENT SYSTEM USING AN IoT ARCHITECTURAL FRAMEWORK TO CONTROL DEPLOYMENT OF VOLATILE CORROSION INHIBITORS (VCIs) FOR SOIL-SIDE CORROSION MITIGATION OF ABOVEGROUND STORAGE TANKS

(71) Applicant: Saudi Arabian Oil Company, Dhahran (SA)

(72) Inventors: Hasan Ali Al-Hashmy, Dhahran (SA); Christian Canto Maya, Dhahran (SA); Bashaer Abdullah Al-Hammad, Jubail (SA); Hamad A. Al-Saiari, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 781 days.

(21) Appl. No.: 17/644,568

(22) Filed: Dec. 16, 2021

(65) Prior Publication Data

US 2023/0193477 A1 Jun. 22, 2023

(51) Int. Cl.

| | |
|---|---|
| ***C23F 11/00*** | (2006.01) |
| ***B65D 90/22*** | (2006.01) |
| ***E04H 7/04*** | (2006.01) |
| ***G16Y 40/10*** | (2020.01) |

(52) U.S. Cl.

CPC .............. *C23F 11/00* (2013.01); *B65D 90/22* (2013.01); *E04H 7/04* (2013.01); *G16Y 40/10* (2020.01)

(58) Field of Classification Search

CPC .................................. E04H 7/04; G16Y 40/10

See application file for complete search history.

(56) References Cited

U.S. PATENT DOCUMENTS

| | | | |
|---|---|---|---|
| 5,096,087 A | 3/1992 | Thomas | |
| 5,172,584 A | 12/1992 | Thomas | |
| 7,874,764 B2 | 1/2011 | Fossen et al. | |
| 8,354,072 B2 | 1/2013 | Lyublinski et al. | |

(Continued)

OTHER PUBLICATIONS

Mqadi, Nkanyezi. "Application of loT (Internet of Things) in the Monitoring and Control of Offshore Oil & Gas Production Platforms." Publication No. 1157737. Master's Thesis, University of the Witwatersrand. 2020. (Year: 2020).*

Yu, Xianming, Saudi Arabian Oil Company "Evaluation of the Tank Bottom Corrosion and CP Effectiveness at a Saudi Aramco Crude Oil Tank Farm," in 13th Middle East Corrosion Conference & Exhibition, paper No. 10043, 12 pages.

(Continued)

*Primary Examiner* — Timothy C Cleveland

(74) *Attorney, Agent, or Firm* — Leason Ellis LLP

(57) ABSTRACT

An Internet of things (IoT) based system for deploying volatile corrosion inhibitor (VCI) in order to mitigate soil-side corrosion of an aboveground storage tank is provided. The system includes: a VCI tank for storing the VCI; corrosion detection sensors on a soil side of the storage tank for detecting the soil-side corrosion, generating corresponding detection signals, and transmitting the detection signals over the Internet; a control circuit including control logic for receiving the detection signals, generating a flow control signal, and transmitting the flow control signal over the Internet; and a flow control valve (FCV) for receiving the flow control signal and controlling a flow of the VCI from the VCI tank to the soil side of the storage tank in response to the flow control signal in order to mitigate the soil-side corrosion of the storage tank.

16 Claims, 4 Drawing Sheets

(56) References Cited

U.S. PATENT DOCUMENTS

| | | | | |
|---|---|---|---|---|
| 8,377,531 | B2 | 2/2013 | Lyublinski et al. | |
| 10,829,298 | B2 | 11/2020 | Young et al. | |
| 2014/0144916 | A1* | 5/2014 | Jeffries | E04H 7/20 29/428 |
| 2015/0108148 | A1 | 4/2015 | Lyublinski et al. | |
| 2016/0184759 | A1* | 6/2016 | Gencer | C23F 11/02 96/111 |

OTHER PUBLICATIONS

S. Rials et al, "Evaluation of Corrosion Prevention Methods for Aboveground Storage Tank Bottoms", Materials Performance, Jan. 1993, pp. 20-25.

Vasanth, K, (2003), "Vapor Phase Corrosion Inhibitors," ASM Handbook vol. 13A, Corrosion: Fundamentals, Testing, and Protection, USA: American Society of Metals International (ASM), pp. 871-877, 26 pages.

Lyublinski et al., "Corrosion Inhibitors for Long Term Protection of Enclosures", in Nace Corrosion 2013 Conference and Expo, Mar. 2013, paper No. 2165, 7 pages.

C. Fiaud, "Theory and Practice of Vapour Phase Inhibitors", The Institute of Materials, Corrosion Inhibitors, 1994, pp. 1-11.

Lyublinski et al., "Corrosion Protection of Soil Side Bottoms of Aboveground Storage Tanks", in Nace Corrosion 2014, Mar. 2014, paper No. 4337, pp. 1-12.

Corrosion Monitoring of Soil-Side Bottoms of Aboveground Storage Tanks Using Electrical Resistance Method, Metal Samples, Application Note #4; 2 pages, 2015.

* cited by examiner

INTELLIGENT SYSTEM USING AN IoT ARCHITECTURAL FRAMEWORK TO CONTROL DEPLOYMENT OF VOLATILE CORROSION INHIBITORS (VCIs) FOR SOIL-SIDE CORROSION MITIGATION OF ABOVEGROUND STORAGE TANKS

FIELD OF THE DISCLOSURE

The present disclosure relates in general to corrosion mitigation and in particular to an intelligent system using an Internet of things (IoT) architectural framework to control deployment of volatile corrosion inhibitors (VCIs) for soil-side corrosion mitigation of aboveground storage tanks.

BACKGROUND OF THE DISCLOSURE

Large numbers of aboveground metal storage tanks are used for multiple storage applications, such as oil emulsion, crude lights, treated water, and the like. Ensuring the integrity of the storage tanks is a major undertaking. Multiple integrity activities take place to maintain the reliability of the assets, such as on the internal side of the storage tank, and on the external side (such as the soil side) of the tank. To confirm the successful implementation of the integrity activities, different inspection programs are designed at set or predefined time intervals. Nonetheless, problems such as soil-side corrosion of the tanks can still take place, and often are not detected or treated until the damage is extensive and the repairs costly.

It is in regard to these and other problems in the art that the present disclosure is directed to provide a technical solution for an effective intelligent system using an Internet of things (IoT) architectural framework to control deployment of volatile corrosion inhibitors (VCIs) for soil-side corrosion mitigation of aboveground storage tanks.

SUMMARY OF THE DISCLOSURE

According to a first aspect of the disclosure, an Internet of things (IoT) based system for deploying volatile corrosion inhibitor (VCI) in order to mitigate soil-side corrosion of an aboveground storage tank is provided. The system comprises a VCI tank configured to store the VCI, a plurality of corrosion detection sensors on a soil side of the aboveground storage tank, a control circuit, and a flow control valve (FCV). The corrosion detection sensors are configured to detect the soil-side corrosion of the storage tank, to generate corresponding corrosion detection signals in response to the detected soil-side corrosion, and to transmit the generated corrosion detection signals over the Internet. The control circuit comprises control logic configured to receive the transmitted corrosion detection signals over the Internet from the corrosion detection sensors, generate a flow control signal in response to the received corrosion detection signals, and transmit the generated flow control signal over the Internet. The FCV is configured to receive the transmitted flow control signal over the Internet from the control circuit, and to control a flow of the VCI from the VCI tank to the soil side of the storage tank in response to the received flow control signal in order to mitigate the soil-side corrosion of the storage tank.

In an embodiment consistent with the above, the control circuit is part of a distributed control system (DCS).

In an embodiment consistent with the above, the control circuit is part of a mobile device and the control logic is part of a mobile application controlling the FCV to mitigate the soil-side corrosion of the storage tank.

In an embodiment consistent with the above, the detection sensors, the control circuit, and the FCV are configured to operate while the storage tank is online and storing a fluid, in order to mitigate the soil-side corrosion of the storage tank.

In an embodiment consistent with the above, the storage tank comprises leak detection conduit on the soil side, and the FCV couples the VCI tank to the leak detection conduit in order to control the flow of the VCI from the VCI tank to the leak detection conduit in response to the received flow control signal, in order to deploy the VCI throughout the soil side of the storage tank.

In an embodiment consistent with the above, the system further comprises a leak detection sensor coupled to an external port of the leak detection conduit and configured to detect a leak on the soil side of the storage tank, generate a leak detection signal in response to the detected leak, and transmit the generated leak detection signal over the Internet. The control logic is further configured to receive the transmitted leak detection signal over the Internet from the leak detection sensor and generate the flow control signal in response to the received leak detection signal.

In an embodiment consistent with the above, the leak detection conduit is arranged in interconnected concentric loops on the soil side of the storage tank.

In an embodiment consistent with the above, the generated corrosion detection signals vary directly in response to corresponding levels of the detected corrosion, and the control logic is further configured to operate as a feedback loop by varying the generated flow control signal in response to the varying received corrosion detection signals in order to control the FCV to vary the flow of the VCI from the VCI tank to the soil side of the storage tank in response to the detected corrosion levels.

In an embodiment consistent with the above, the system further comprises a cathodic protection (CP) system for further mitigating the soil-side corrosion of the storage tank.

In an embodiment consistent with the above, the corrosion detection sensors comprise electrical resistance (ER) probes configured to detect the soil-side corrosion of the storage tank.

According to another aspect of the disclosure, an Internet of things (IoT) based method for deploying volatile corrosion inhibitor (VCI) in order to mitigate soil-side corrosion of an aboveground storage tank is provided. The method comprises: storing the VCI in a VCI tank; detecting the soil-side corrosion of the aboveground storage tank using a plurality of corrosion detection sensors on a soil side of the storage tank; generating, by the corrosion detection sensors, corresponding corrosion detection signals in response to the detected soil-side corrosion; transmitting, by the corrosion detection sensors, the generated corrosion detection signals over the Internet; receiving, by a control circuit, the transmitted corrosion detection signals over the Internet from the corrosion detection sensors; generating, by the control circuit, a flow control signal in response to the received corrosion detection signals; transmitting, by the control circuit, the generated flow control signal over the Internet; receiving, by a flow control valve (FCV), the transmitted flow control signal over the Internet from the control circuit; and controlling, by the FCV, a flow of the VCI from the VCI tank to the soil side of the storage tank in response to the received flow control signal in order to mitigate the soil-side corrosion of the storage tank.

In an embodiment consistent with the method described above, the control circuit is part of a distributed control system (DCS).

In an embodiment consistent with the method described above, the control circuit is part of a mobile device running a mobile application controlling the FCV to mitigate the soil-side corrosion of the storage tank.

In an embodiment consistent with the method described above, the method further comprises operating the detection sensors, the control circuit, and the FCV while the storage tank is online and storing a fluid, to mitigate the soil-side corrosion of the storage tank.

In an embodiment consistent with the method described above, the storage tank comprises leak detection conduit on the soil side, the FCV couples the VCI tank to the leak detection conduit, and the method further comprises controlling the flow of the VCI from the VCI tank to the leak detection conduit in response to the received flow control signal in order to deploy the VCI throughout the soil side of the storage tank.

In an embodiment consistent with the method described above, the method further comprises: detecting a leak on the soil side of the storage tank using a leak detection sensor coupled to an external port of the leak detection conduit; generating, by the leak detection sensor, a leak detection signal in response to the detected leak; transmitting, by the leak detection sensor, the generated leak detection signal over the Internet; receiving, by the control circuit, the transmitted leak detection signal over the Internet from the leak detection sensor; and generating, by the control circuit, the flow control signal in response to the received leak detection signal.

In an embodiment consistent with the method described above, the leak detection conduit is arranged in interconnected concentric loops on the soil side of the storage tank.

In an embodiment consistent with the method described above, the generated corrosion detection signals vary directly in response to corresponding levels of the detected corrosion, and the method further comprises operating, by the control circuit, as a feedback loop by varying the generated flow control signal in response to the varying received corrosion detection signals in order to control the FCV to vary the flow of the VCI from the VCI tank to the soil side of the storage tank in response to the detected corrosion levels.

In an embodiment consistent with the method described above, the method also comprises further mitigating the soil-side corrosion of the storage tank using a cathodic protection (CP) system.

In an embodiment consistent with the method described above, detecting the soil-side corrosion of the storage tank comprises using a plurality of electrical resistance (ER) probes on the soil side of the storage tank.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1A:
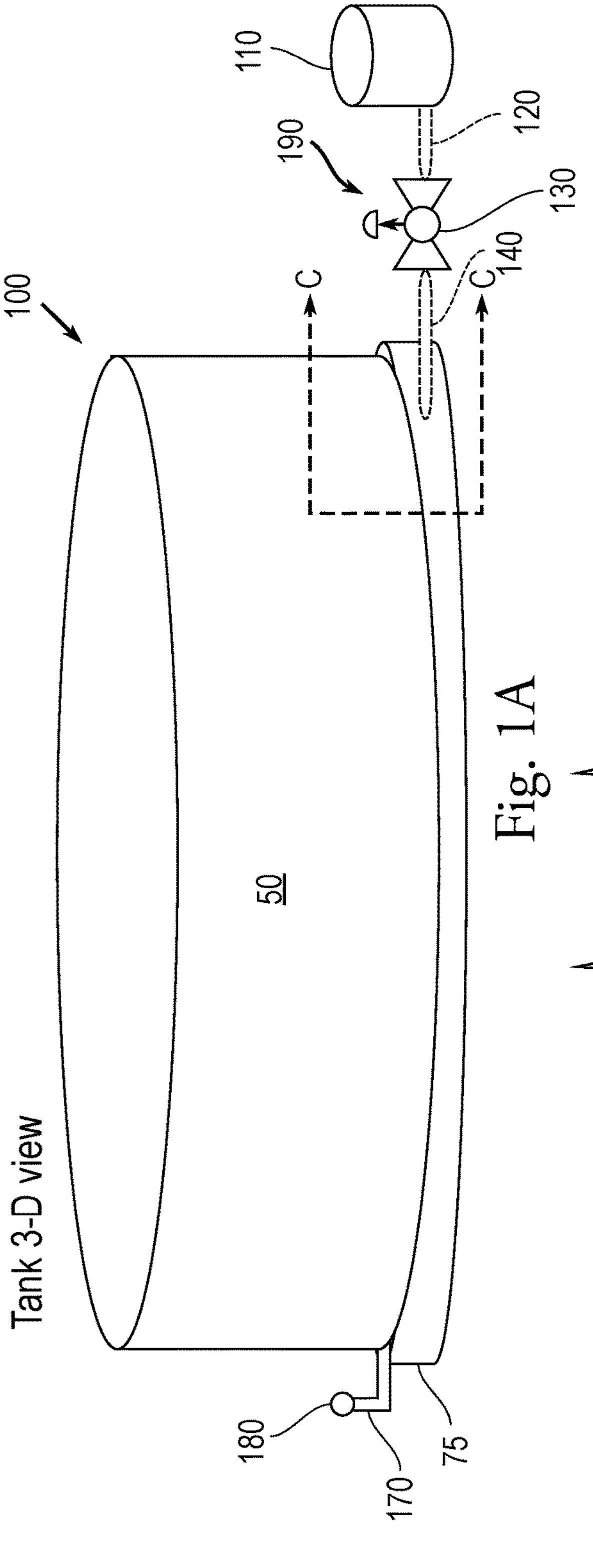
FIGS. 1A-1B are schematic diagrams of an example Internet of things (IoT) based system for deploying volatile corrosion inhibitor (VCI) in order to mitigate soil-side corrosion of an aboveground storage tank, according to an embodiment.

Example embodiments of the present disclosure are directed to techniques of an intelligent system using an Internet of things (IoT) architectural framework to control and fully automate deployment of volatile corrosion inhibitors (VCIs) for soil-side corrosion mitigation in aboveground storage tanks. In some embodiments, the system includes a VCI storage tank, corrosion detection sensors, a flow control valve, and an IoT system connected to either a distributed control system (DCS) or a mobile application. In some embodiments, the system is programmed or otherwise configured to fully automate deployment of VCIs for soil-side corrosion mitigation in aboveground storage tanks. In some embodiments, the system uses leak detection devices or sensors found at the soil-side of the tank in which the corrosion mitigation process is being performed. In some embodiments, the soil-side corrosion mitigation can be done while the tank is online or out of service. In some embodiments, an IoT-based system is provided to monitor the performance of and regulate the delivery of the corrosion inhibitor in real time for aboveground storage tanks used in the oil and gas industry.

A common problem for protecting aboveground metal storage tanks is internal corrosion, which is particularly prevalent when storing light products (such as light petroleum or petrochemical products) and treated oil. This can lead to soil-side corrosion and failures in the assets. In addition, unscheduled service interruption due to loss of containment in one of the storage tanks represents an undesired repair activity, which requires multiple man hours and economic losses. While maintaining integrity programs can help reduce the likelihood of failures, sometimes the control strategies fail due to multiple reasons, and the lack of the mitigation performance is observed at the moment of the failure.

It is in regard to these and other problems that example embodiments of the present disclosure are directed to mitigating soil-side corrosion through the automated deployment of VCIs using IoT architectural framework. In some embodiments, corrosion inspection activities are reduced by maintaining an adequate protection against corrosion on the soil side (bottom) of the tanks. In some embodiments, an IoT-based system of monitoring the inhibitor performance in real time and adjusting the inhibitor consumption rates is provided. In some such embodiments, the IoT is used to allow the sensors to communicate with the VCI (chemical) pump in order to better control the VCI consumption and to improve protection of the soil side of the aboveground storage tank. Some of the embodiments described herein provide for automated communication technology (e.g., via the IoT) between the corrosion or leak detection sensors and the VCI pump injection. In some such embodiments, the IoT-based system mitigates the soil-side corrosion of aboveground storage tanks while reducing or optimizing the chemical (e.g., VCI) usage. Such embodiments help maintain the integrity of the bottom side (soil side) of aboveground storage tanks.

In some embodiments, this automated VCI deployment is combined with soil-side corrosion techniques such as cathodic protection (CP). CP is not adequate by itself, for sometimes the electric potential needed to protect the structure by CP is not reached, leading to corrosion of the bottom plates at the soil side of the tank. According to some embodiment, this scenario is mitigated by adding the automated VCI deployment to ensure soil-side integrity. In some embodiments, the automated VCI deployment component is part of the original design of the corrosion mitigation system. For instance, it is not always possible or practical to add the automated VCI deployment system to an existing storage tank using only a CP system for corrosion prevention. Thus, by building the automated VCI deployment system into the storage tank from the beginning, the VCI system serves as an additional layer of protection for when the CP system deviates from its intended or optimal performance, leading to a lack of protection from the CP system.

In some embodiments, the introduction of a second layer of protection with the volatile corrosion inhibitors helps to maintain the integrity at all times during the operations of the tank. In some embodiments, the application of volatile corrosion inhibitors also reduces the inspection intervals for aboveground storage tanks that present external corrosion problems, as the inhibitors support cathodic protection to improve the reliability of the tanks. In some embodiments, automated delivery of the VCI provides for the required amount of VCI to be injected at the desired location as well as providing adequate time for refilling the reservoir with a new batch of VCI. In some embodiments, the automated refilling uses a circuit (such as a hardware circuit or microprocessor) programmed or other configured to maintain the appropriate concentration of VCI in order to avoid unnecessary consumption of the VCI during the delivery.

In example embodiments, a corrosion mitigation system delivers volatile corrosion inhibitors (VCIs) through an implementation in the industrial Internet of things (IIoT) cloud. This cloud communication system is configured (such as through software or custom logic) to adjust the required chemical injection as a function of the volatile inhibitor performance at the required concentration at the metal surface. To this end, a mass record and open circuit potential sensor installed at multiple locations along the bottom side of the tank provides input to the system. The system, in turn, is programmed or otherwise configured to use this input in order to control the injection dosage of the VCI. In some embodiments, this communication system is closed between the injection pump and the sensor information.

In some embodiments, the IoT-based corrosion mitigation system allows operations to maintain at least one layer of protection at the bottom (soil side) of the tank. In some embodiments, the system includes an operations control circuit configured (e.g., by code or other logic) to optimize the consumption of chemicals (e.g., VCI) while not compromising the integrity of the soil-side corrosion mitigation. In some embodiments, the system is programmed or otherwise configured to determine the inspection intervals by monitoring the cycles of chemical reinjection.

Figure 1B:
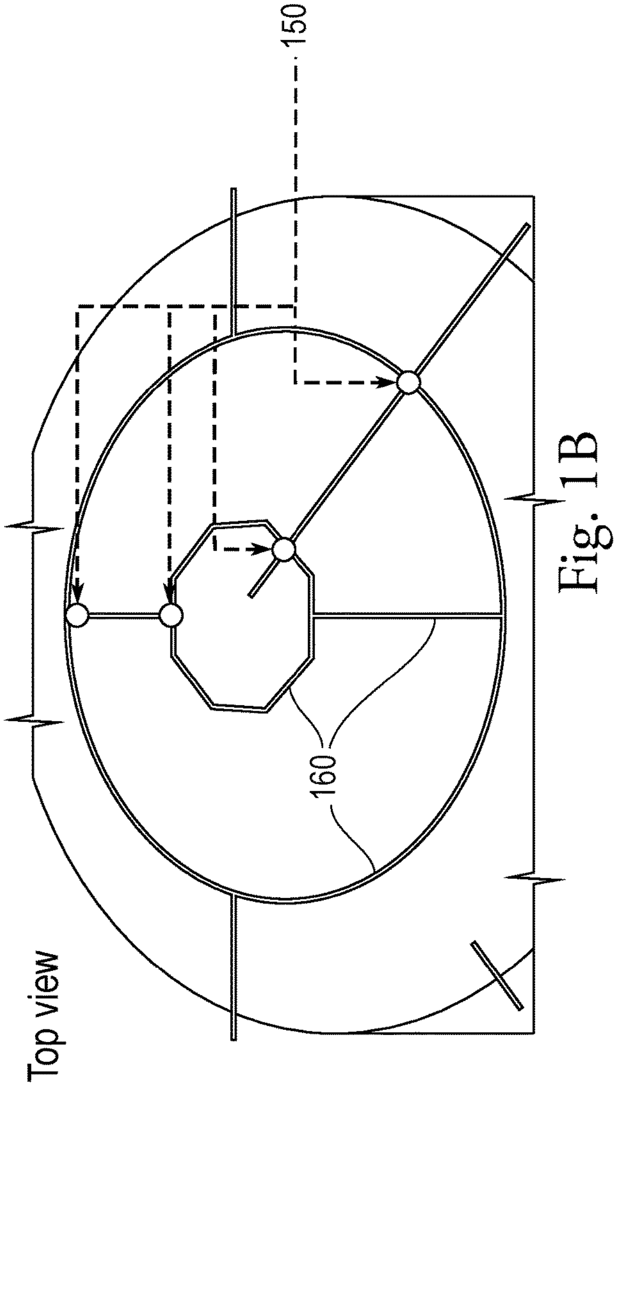
Figure 2:
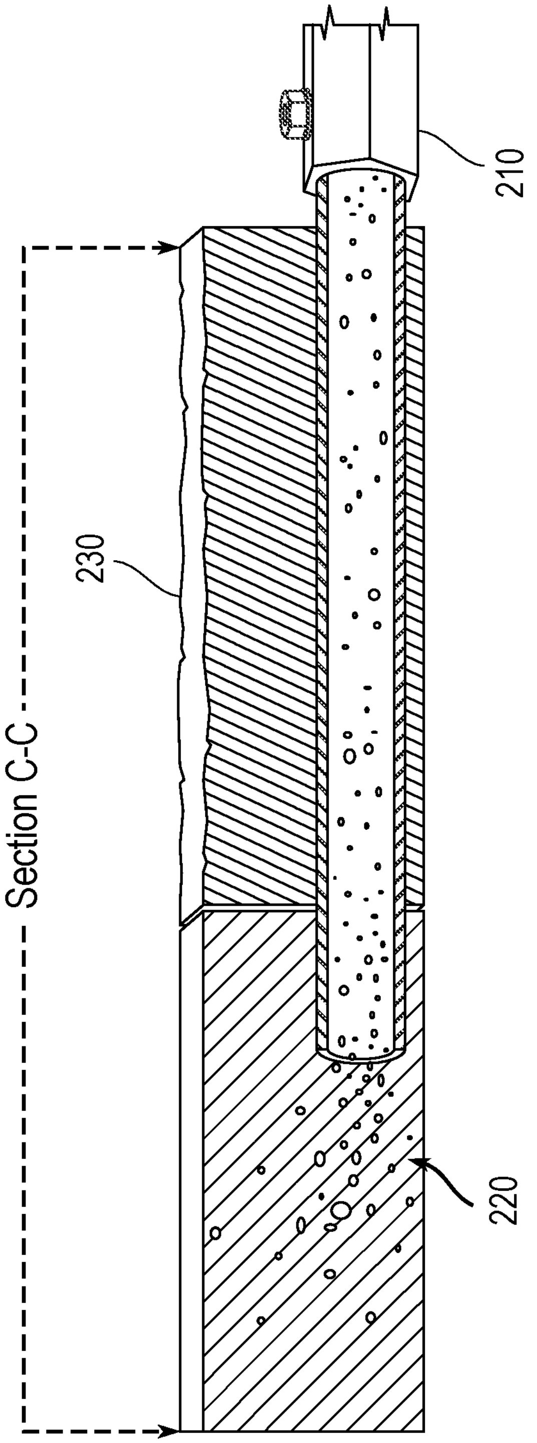
FIG. 2 is an example cutaway illustration of section C-C of FIG. 1A, according to an embodiment.

FIGS. 1A-1B are schematic diagrams of an example Internet of things (IoT) based system 100 for deploying volatile corrosion inhibitor (VCI) in order to mitigate soil-side corrosion of an aboveground storage tank 50, according to an embodiment. FIG. 2 is an example cutaway illustration of section C-C of FIG. 1A, according to an embodiment. FIGS. 1A-1B present a schematic design of a fully automated system 100 of VCI deployment at the soil side 75 of the tank 50.

In further detail, the IoT-based VCI deployment system 100 includes a VCI storage tank 110 (holding a mixture of VCI slurry), several corrosion detection sensors 150, a flow control valve (FCV) 130, and a control circuit 190 that is part of, for example, a distributed control system (DCS) or a mobile computing platform (e.g., smartphone, tablet, laptop) running a mobile application. In some embodiments, the corrosion detection sensors 150 are electrical resistance (ER) sensors. Here, the control circuit 190 is configured (e.g., by code or custom logic) to use the outputs of the corrosion detection sensors 150 to generate a corresponding flow control signal in order to control the FCV 130.

Initially, the mixture of VCI slurry releases from the storage tank 110 (such as in a set or predetermined rate) to the FCV 130 via a VCI slurry feed port 120. The FCV 130 in turn controls the precise amount of VCI slurry mixture released to the soil side of the tank, that is, released below the bottom 75 of the tank 50 through communicating with the IoT system 190. The IoT system 190 is connected to the corrosion detection sensors 150 located at the bottom 75 of the tank 50. The VCI slurry then reaches a VCI slurry injection port 140 (also referred to as a leak detection port 140). From the injection port 140, the VCI slurry deploys throughout the soil side 75 by utilizing a built-in circular leak detection system (or leak detection conduit) 160 as shown in the cutaway top view of FIG. 1B. Here, the leak detection conduit 160 is arranged in interconnected concentric loops on the soil side 75 of the bottom of the storage tank 50. A leak detection sensor (or leak sensor) 180 located at an outlet 170 of a leak detection system of the soil side 75 is also employed. In some embodiments, the leak sensor 180 is used to supplement the corrosion detection sensors 150, increasing the redundancy and fault tolerance of the whole system 100.

In further detail with reference to FIGS. 1A-2, the VCI slurry automatically injects 210 through VCI slurry injection port 140 from VCI tank 120 through FCV 130 under control of control circuit 190. In some embodiments, the control circuit 190 is programmed to detect levels of corrosion on the soil side of storage tank 50 using the sensor readings of corrosion detection sensors 150. This leads to the VCI slurry deploying 220 underneath the corroded area 230 of the soil side of the aboveground storage tank 50.

Figure 3:
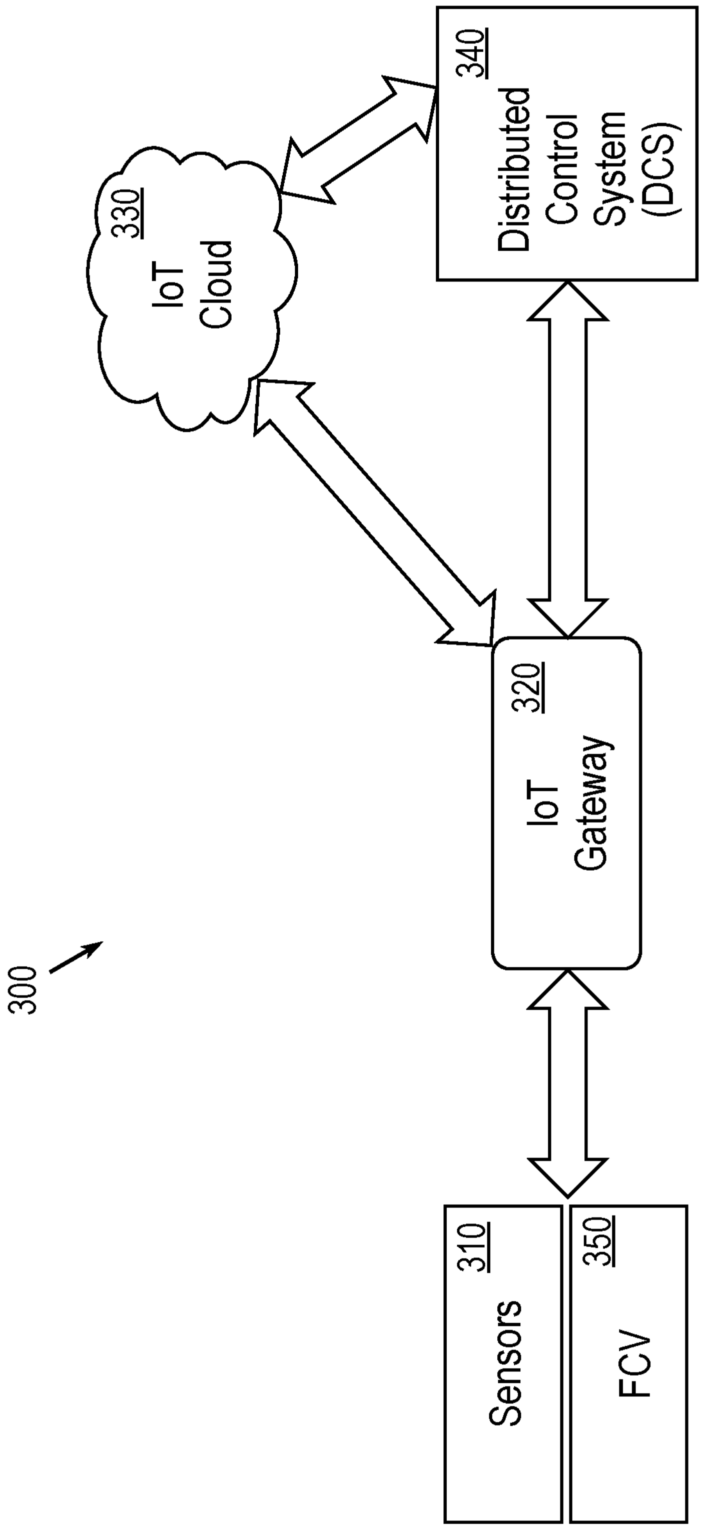
FIG. 3 is a block diagram of an example IoT architectural framework for an automated VCI deployment system to mitigate soil-side corrosion of an aboveground storage tank, according to an embodiment.

FIG. 3 is a block diagram of an example IoT architectural framework 300 for an automated VCI deployment system (such as the automated VCI deployment system 100 of FIG. 1) to mitigate soil-side corrosion of an aboveground storage tank (such as aboveground storage tank 50), according to an embodiment. Here, the Internet of things (IoT) refers to the connectivity of all networking devices, including both physical and abstract (or virtual) components, in order to achieve different aspects of services form the many interconnected devices. For example, the IoT-based VCI deployment system 100 includes Internet-connected components such as the corrosion detection sensors 150, the control circuit 190, the FCV 130, and the leak detection sensor 180.

More generally, the IoT connects components (things) through the Internet. As applied to some embodiments of the automated VCI deployment system, the components break into three parts: actuators (e.g., FCV 350) and sensors (e.g., corrosion detection sensors 310), the gateway (e.g., IoT gateway 320), and the backend services (e.g., IoT cloud 330 and distributed control system (DCS) 340). Depending on the embodiment, different IoT communication models are used to interconnect the components. These models include device to cloud, device to device, backend data sharing, and device to gateway, to name a few.

In further detail, device to cloud communication involves the devices that make up the IoT connecting the cloud services on the Internet, such as a network administrator controlling all devices accessing a service from the cloud. It is a technique that effectively uses existing connections to effect successful connection of the devices to the cloud. Device to device communication involves having all devices being capable of communication with the help of application servers as an intermediary. Example protocols to effect this include ZigBee and Bluetooth. These protocols offer openness of the devices regardless of the manufacturing properties, allowing communication to occur on these devices. Backend data sharing communication allows users to acquire data from different cloud sources in order to analyze and report them in ways they see fit for their presentation. This model is an improved version of the device to cloud model with the feature of the application servers being available in the cloud as well. The device to gateway communication model involves all the devices connecting to an application layer gateway for accessing a service in the cloud.

Referring again to FIG. 3, the IoT architecture 300 includes corrosion detection sensors 310 (such as ER probes) that measure the levels of soil-side corrosion of the storage tank and transmit the measured corrosion over the Internet using the IoT gateway 320. The transmitted corrosion levels are stored in the IoT cloud 330. A control circuit of the DCS 340 retrieves the stored corrosion levels and controls the FCV 350 based on the retrieved corrosion levels. In more detail, the control circuit 340 is programmed or otherwise configured (e.g., through custom hardware logic) to retrieve the stored corrosion levels and, based on the retrieved corrosion levels, control the FCV 350 to release VCI from the VCI tank to the soil-side of the aboveground storage tank based on the retrieved corrosion levels. In some embodiments, the control circuit 340 is programmed or otherwise configured to generate a flow control signal based on the retrieved corrosion levels, and to transmit the generated flow control signal over the Internet through the IoT gateway 320. The FCV 350 is configured (e.g., by code or other logic) to receive the transmitted flow control signal and control the opening (or closing) of the FCV 350 based on the received flow control signal.

In some embodiments, the described techniques herein can be implemented as an automated control loop (such as a distributed control loop) in an aboveground storage tank using a combination of sensors, valves, and other devices including computing, control, or other logic circuits configured (e.g., programmed) to carry out their assigned tasks. These devices are located on or in (or otherwise in close proximity to or interconnected through the IoT to) the aboveground storage tank for carrying out the techniques. In some example embodiments, the control logic is implemented as computer code configured to be executed on a computing circuit (such as a microprocessor) to perform the control steps that are part of the technique.

In some embodiments, the described techniques can automatically apply volatile corrosion inhibitors (VCIs) to protect in-service tanks while the tanks are actively storing liquids (such as petroleum, petrochemicals, or water). In some such embodiments, the techniques are performed without disruption of the tank storage and without disturbing the storage tank or soil side of the storage tank. In some such embodiments, the automatic application of VCI to the soil side of the storage tank is followed by further automatic monitoring of the soil side of the storage tank in order to determine if or when further VCI should be applied to the soil side of the storage tank. In some such embodiments, the automatic VCI application to the soil side of the storage tank is part of a feedback control loop that adjusts the amount of VCI application to the soil side in relation to (such as in proportion to) the detected corrosion levels of the soil side of the storage tank. In addition, in some embodiments, the level of VCI in the VCI tank is monitored to know when to indicate that the VCI level in the VCI tank is low and needs to be replenished.

In some embodiments, the described technology improves or optimizes the use of chemical injection at the soil-side bottom of the aboveground storage tank by monitoring the inhibitor performance and adsorption along the bottom plate, such as by using corrosion detection sensors located on the soil side bottom of the storage tank. In some such embodiments, the IoT VCI deployment system is configured (e.g., by code) to use the corrosion detection sensors in order to monitor the performance and consumption of the VCI in real time. In addition, an industrial IoT (IIoT) approach is used to control the dosage required in order to control or regulate (e.g., decrease or optimize) the consumption of VCI.

Figure 4:
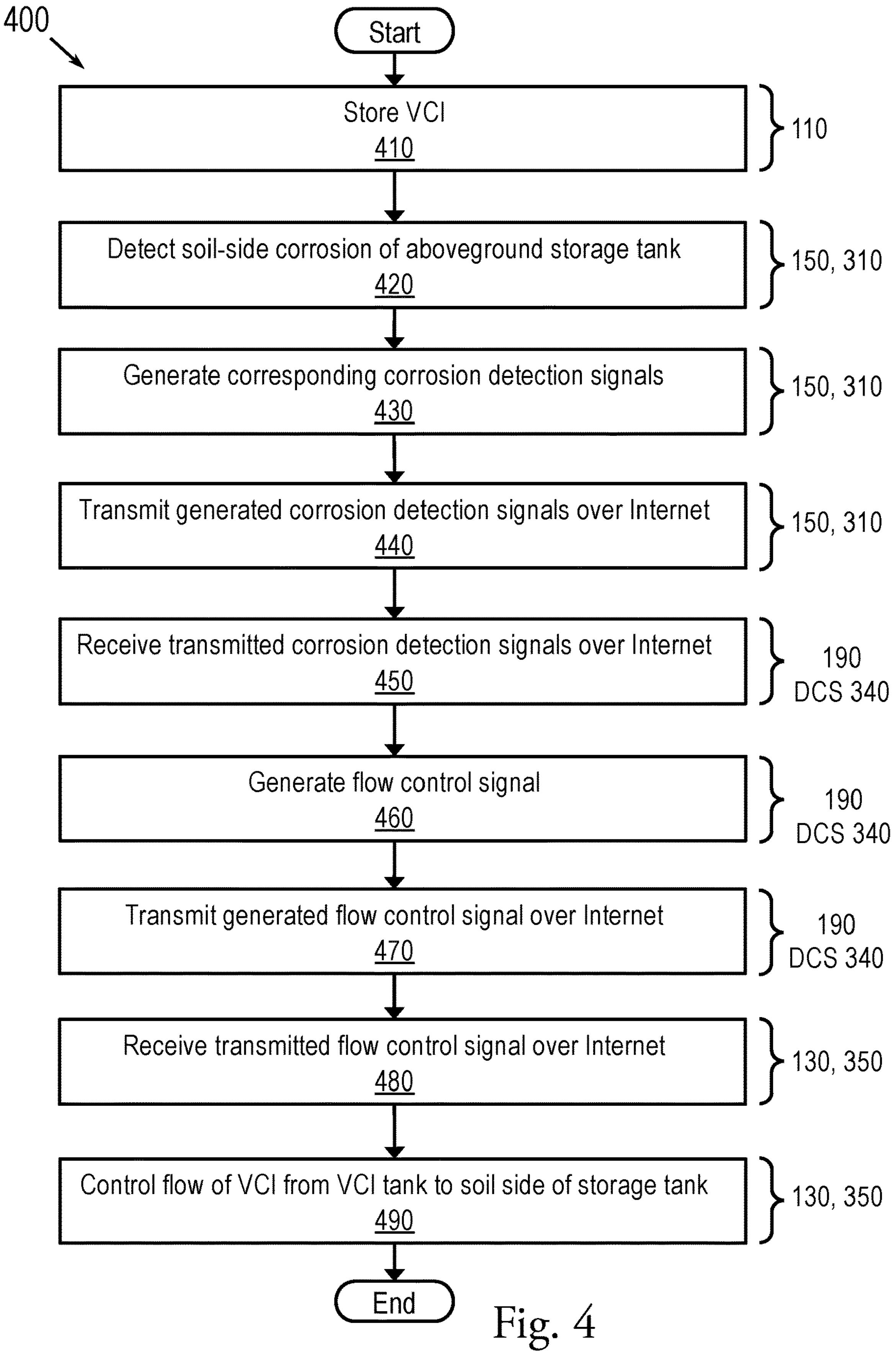
FIG. 4 is a flow diagram of an example IoT-based method for deploying volatile corrosion inhibitor (VCI) in order to mitigate soil-side corrosion of an aboveground storage tank, according to an embodiment.

FIG. 4 is a flow diagram of an example IoT-based method 400 for deploying volatile corrosion inhibitor (VCI) in order to mitigate soil-side corrosion of an aboveground storage tank (such as aboveground storage tank 50), according to an embodiment. The storage tank can store, for example, petroleum or petrochemicals. The method 400 is automated under the control of an electronic circuit (such as control circuit 190), which is configured (e.g., by code, such as programmed, by custom logic, as in configurable logic gates, or the like) to carry out the steps of the method 400.

Some or all of the method 400 can be performed using components and techniques illustrated in FIGS. 1A-3. In addition, portions of this and other methods or processes disclosed herein can be performed on or using process control logic, such as custom or preprogrammed control logic devices, circuits, or processors, as in a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause portions of the method 400 (or other disclosed method or process) to be carried out. It should be noted that in other embodiments, the order of the operations can be varied, and that some of the operations can be omitted. Some of the method 400 can also be performed using logic, circuits, or processors located on or in electrical communication with a processing circuit configured by code to carry out these portions of the method 400.

In the method 400 processing begins with the step of storing 410 the VCI in a VCI tank (such as VCI tank 110). The method 400 further includes the step of detecting 420 the soil-side corrosion of the aboveground storage tank using a plurality of corrosion detection sensors (such as corrosion detection sensors 150 or 310) on a soil side (such as soil side 75) of the storage tank. In addition, the method 400 includes the step of generating 430, by the corrosion detection sensors, corresponding corrosion detection signals in response to the detected soil-side corrosion. The method 400 also includes the step of transmitting 440, by the corrosion detection sensors, the generated corrosion detection signals over the Internet. The method 400 further includes the step of receiving 450, by a control circuit (such as control circuit 190 or DCS 340), the transmitted corrosion detection signals over the Internet from the corrosion detection sensors.

In addition, the method 400 includes the step of generating 460, by the control circuit, a flow control signal in response to the received corrosion detection signals. The method 400 also includes the step of transmitting 470, by the control circuit, the generated flow control signal over the Internet. The method 400 further includes the step of receiving 480, by a flow control valve (FCV, such as FCV 130 or 350), the transmitted flow control signal over the Internet from the control circuit. Finally, the method 400 includes the step of controlling 490, by the FCV, a flow of the VCI from the VCI tank to the soil side of the storage tank in response to the received flow control signal in order to mitigate the soil-side corrosion of the storage tank.

In an embodiment, the control circuit is part of a distributed control system (DCS, such as DCS 340). In an embodiment, the control circuit is part of a mobile device running a mobile application controlling the FCV to mitigate the soil-side corrosion of the storage tank. In an embodiment, the method 400 further includes the step of operating the detection sensors, the control circuit, and the FCV while the storage tank is online and storing a fluid, to mitigate the soil-side corrosion of the storage tank. In an embodiment, the storage tank includes leak detection conduit (such as leak detection conduit 160) on the soil side, the FCV couples the VCI tank to the leak detection conduit, and the method 400 further includes the step of controlling the flow of the VCI from the VCI tank to the leak detection conduit in response to the received flow control signal in order to deploy the VCI throughout the soil side of the storage tank.

In an embodiment, the method 400 further includes the steps of: detecting a leak on the soil side of the storage tank using a leak detection sensor (such as leak detection sensor 180) coupled to an external port of the leak detection conduit; generating, by the leak detection sensor, a leak detection signal in response to the detected leak; transmitting, by the leak detection sensor, the generated leak detection signal over the Internet; receiving, by the control circuit, the transmitted leak detection signal over the Internet from the leak detection sensor; and generating, by the control circuit, the flow control signal in response to the received leak detection signal. In an embodiment, the leak detection conduit is arranged in interconnected concentric loops on the soil side of the storage tank.

In an embodiment, the generated corrosion detection signals vary directly in response to corresponding levels of the detected corrosion, and the method 400 further includes the step of operating, by the control circuit, as a feedback loop by varying the generated flow control signal in response to the varying received corrosion detection signals in order to control the FCV to vary the flow of the VCI from the VCI tank to the soil side of the storage tank in response to the detected corrosion levels. In an embodiment, the method 400 also includes the step of further mitigating the soil-side corrosion of the storage tank using a cathodic protection (CP) system. In an embodiment, the step of detecting the soil-side corrosion of the storage tank includes using a plurality of electrical resistance (ER) probes on the soil side of the storage tank.

Any of the methods described herein may, in corresponding embodiments, be reduced to a non-transitory computer readable medium (CRM) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An Internet of things (IoT) based system for deploying volatile corrosion inhibitor (VCI), the system comprising:

a VCI tank configured to store the VCI;

an aboveground storage tank having a bottom in contact with soil and presenting a soil-side surface for corrosion mitigation using the VCI;

a VCI injector that is located exterior to and below the aboveground storage tank and is configured to selectively inject the VCI from the VCI tank into the soil beneath the bottom of the aboveground storage tank, wherein the VCI injector comprises a leak detection conduit on the soil side of the storage tank, wherein the leak detection conduit is arranged in interconnected concentric loops on the soil side of the storage tank;

a plurality of corrosion detection sensors on a soil side of the aboveground storage tank and configured to detect the soil-side corrosion of the storage tank, to generate corresponding corrosion detection signals in response to the detected soil-side corrosion, and to transmit the generated corrosion detection signals over the Internet;

a control circuit comprising control logic configured to receive the transmitted corrosion detection signals over the Internet from the corrosion detection sensors, generate a flow control signal in response to the received corrosion detection signals, and transmit the generated flow control signal over the Internet;

a flow control valve (FCV) configured to receive the transmitted flow control signal over the Internet from the control circuit, and to control a flow of the VCI from the VCI tank through the VCI injector to the soil side of the storage tank in response to the received flow control signal in order to mitigate the soil-side corrosion of the storage tank, and a leak detection sensor coupled to an external port of the leak detection conduit and configured to detect a leak on the soil side of the storage tank, generate a leak detection signal in response to the detected leak, and transmit the generated leak detection signal over the Internet, wherein the control logic is further configured to receive the transmitted leak detection signal over the Internet from the leak detection sensor and generate the flow control signal in response to the received leak detection signal, the leak detection sensor and the external port being disposed above ground proximate the aboveground storage tank.

2. The system of claim 1, wherein the control circuit is part of a distributed control system (DCS).

3. The system of claim 1, wherein the control circuit is part of a mobile device and the control logic is part of a mobile application controlling the FCV to mitigate the soil-side corrosion of the storage tank.

4. The system of claim 1, wherein the detection sensors, the control circuit, and the FCV are configured to operate while the storage tank is online and storing a fluid, in order to mitigate the soil-side corrosion of the storage tank.

5. The system of claim 1, wherein the VCI injector comprises a leak detection conduit on the soil side of the storage tank, the FCV couples the VCI tank to the leak detection conduit in order to control the flow of the VCI from the VCI tank to the leak detection conduit in response to the received flow control signal, in order to automatically deploy the VCI throughout the soil along the soil side of the storage tank, and wherein the automatic deployment of VCI to the soil side of the storage tank is followed by further automatic monitoring of the soil side of the storage tank in order to determine if or when further VCI should be applied to the soil along the soil side of the storage tank.

6. The system of claim 1, wherein the generated corrosion detection signals vary directly in response to corresponding levels of the detected corrosion, and the control logic is further configured to operate as a feedback loop by varying the generated flow control signal in response to the varying received corrosion detection signals in order to control the FCV to vary the flow of the VCI from the VCI tank to the soil side of the storage tank in response to the detected corrosion levels.

7. The system of claim 1, further comprising a cathodic protection (CP) system for further mitigating the soil-side corrosion of the storage tank.

8. The system of claim 1, wherein the corrosion detection sensors comprise electrical resistance (ER) probes configured to detect the soil-side corrosion of the storage tank.

9. An Internet of things (IoT) based method for deploying volatile corrosion inhibitor (VCI), the method comprising:

storing the VCI in a VCI tank;

detecting soil-side corrosion of an aboveground storage tank wherein the aboveground storage tank has a bottom in contact with soil and presents a soil-side surface for corrosion mitigation using the VCI;

wherein the step of detecting is performed using a plurality of corrosion detection sensors on the soil side of the storage tank; generating, by the corrosion detection sensors, corresponding corrosion detection signals in response to the detected soil-side corrosion;

transmitting, by the corrosion detection sensors, the generated corrosion detection signals over the Internet;

receiving, by a control circuit, the transmitted corrosion detection signals over the Internet from the corrosion detection sensors;

generating, by the control circuit, a flow control signal in response to the received corrosion detection signals;

transmitting, by the control circuit, the generated flow control signal over the Internet;

receiving, by a flow control valve (FCV), the transmitted flow control signal over the Internet from the control circuit;

controlling, by the FCV, a flow of the VCI from the VCI tank, through a VCI injector that is located exterior to and below the aboveground storage tank, to the soil along the soil side of the storage tank in response to the received flow control signal in order to mitigate the soil-side corrosion of the storage tank, wherein the VCI injector includes a leak detection conduit on the soil side of the storage tank, the FCV couples the VCI tank to the leak detection conduit, and the method further comprises controlling the flow of the VCI from the VCI tank to the leak detection conduit in response to the received flow control signal in order to automatically deploy the VCI throughout the soil along the soil side of the storage tank, and wherein the automatic deployment of VCI to the soil side of the storage tank is followed by further automatic monitoring of the soil side of the storage tank in order to determine if or when further VCI should be applied to the soil side of the storage tank;

detecting a leak on the soil side of the storage tank using a leak detection sensor coupled to an external port of the leak detection conduit;

generating, by the leak detection sensor, a leak detection signal in response to the detected leak;

transmitting, by the leak detection sensor, the generated leak detection signal over the Internet;

receiving, by the control circuit, the transmitted leak detection signal over the Internet from the leak detection sensor; and generating, by the control circuit, the flow control signal in response to the received leak detection signal;

wherein the leak detection sensor and the external port are disposed above ground proximate the aboveground storage tank.

10. The method of claim 9, wherein the control circuit is part of a distributed control system (DCS).

11. The method of claim 9, wherein the control circuit is part of a mobile device running a mobile application controlling the FCV to mitigate the soil-side corrosion of the storage tank.

12. The method of claim 9, further comprising operating the detection sensors, the control circuit, and the FCV while the storage tank is online and storing a fluid, to mitigate the soil-side corrosion of the storage tank.

13. The method of claim 9, wherein the leak detection conduit is arranged in interconnected concentric loops on the soil side of the storage tank.

14. The method of claim 9, wherein the generated corrosion detection signals vary directly in response to corresponding levels of the detected corrosion, and the method further comprises operating, by the control circuit, as a feedback loop by varying the generated flow control signal in response to the varying received corrosion detection signals in order to control the FCV to vary the flow of the VCI from the VCI tank to the soil side of the storage tank in response to the detected corrosion levels.

15. The method of claim 9, further comprising further mitigating the soil-side corrosion of the storage tank using a cathodic protection (CP) system.

16. The method of claim 9, wherein detecting the soil-side corrosion of the storage tank comprises using a plurality of electrical resistance (ER) probes on the soil side of the storage tank.

* * * * *